(12) United States Patent
Lun et al.

(10) Patent No.: US 9,540,516 B2
(45) Date of Patent: Jan. 10, 2017

(54) USE OF QUANTUM DOTS IN PIGMENT DISPERSION LIQUID, PIGMENT DISPERSION LIQUID AND PROCESS FOR PRODUCING THE SAME

(71) Applicant: BOE Technology Group Co., LTD., Beijing (CN)

(72) Inventors: Jianchao Lun, Beijing (CN); Yangyang Xin, Beijing (CN); Jinbo Lu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 285 days.

(21) Appl. No.: 14/095,609

(22) Filed: Dec. 3, 2013

(65) Prior Publication Data
US 2014/0158954 A1    Jun. 12, 2014

(30) Foreign Application Priority Data
Dec. 12, 2012    (CN) .......................... 2012 1 0537766

(51) Int. Cl.
G02B 5/23       (2006.01)
C09B 67/20      (2006.01)
C09B 67/04      (2006.01)
C09B 67/46      (2006.01)

(52) U.S. Cl.
CPC ......... *C09B 67/006* (2013.01); *C09B 67/0002* (2013.01); *C09B 67/009* (2013.01)

(58) Field of Classification Search
USPC ....................................................... 252/586
See application file for complete search history.

(56) References Cited

U.S. PATENT DOCUMENTS

2009/0322670 A1*  12/2009  Bhowmik ............... G02F 1/167
                                                                        345/107

FOREIGN PATENT DOCUMENTS

| CN | 1562765 A | | 1/2005 |
|---|---|---|---|
| CN | 101332979 A | | 12/2008 |
| CN | 101659813 | * | 3/2010 |
| CN | 101659813 A | | 3/2010 |
| CN | 102199425 A | | 9/2011 |
| JP | 2009251129 | * | 10/2009 |

OTHER PUBLICATIONS

Second Office Action for Chinese Patent Application No. 2012105377664, dated Oct. 11, 2014, 11 pages.
First Chinese Office Action for Chinese Patent Application No. 201210537766.4, dated Feb. 28, 2014, 10 pages.
Rejection Decision from SIPO for Chinese Patent Application No. 201210537766.4, dated Mar. 19, 2015, 11 pages.

* cited by examiner

*Primary Examiner* — Monique Peets
(74) *Attorney, Agent, or Firm* — Westman, Champlin & Koehler, P.A.

(57) ABSTRACT

The invention relates to use of quantum dots in a pigment dispersion liquid. The invention also relates to a pigment dispersion liquid, which comprises a pigment, quantum dots, a dispersion agent, a dispersing resin and a solvent. The invention also relates to the process for producing the pigment dispersion liquid. The use of quantum dots provided by the invention broadens the application field of the quantum dots and develops the use thereof in the field of liquid crystal display. The pigment dispersion liquid having quantum dots added therein provided by the invention has a significantly improved stability of dispersion. Furthermore, the quantum dots and the organic pigment can interact with each other by adjusting the composition, the size or the like of the quantum dots, so that the properties of the pigment are improved and the contrast thereof is increased.

10 Claims, 2 Drawing Sheets

USE OF QUANTUM DOTS IN PIGMENT DISPERSION LIQUID, PIGMENT DISPERSION LIQUID AND PROCESS FOR PRODUCING THE SAME

CROSS-REFERENCE TO RELATED APPLICATION

This Application is a non-provisional Application of Chinese Application No. CN 201210537766.4, filed Dec. 12, 2012 in Chinese, the contents of which are hereby incorporated by reference in their entirety.

FIELD OF THE INVENTION

The invention relates to the technical field of pigments. Particularly, the invention relates to use of quantum dots in a pigment dispersion liquid, a pigment dispersion liquid containing quantum dots added therein and the process for producing the same.

BACKGROUND OF THE INVENTION

A color filter is a critical component for a liquid crystal display to achieve color display. The white light emitted from a backlight source irradiates onto the color filter, and passes through three (i.e. red, green, and blue) pigment color resists, which are set on the color filter to correspond to each pixel, so as to transmit red, green or blue light. Finally, a color image is formed by combining the pixels of different colors. The methods for producing pigment color resist on the color filter commonly used at present include a dyeing method, a printing method, an electrodeposition method, a pigment dispersing method, etc. The pigment dispersing method, due to its advantages in terms of the color properties, the image precision and the resistance to light and heat, becomes the mainstream method of production. The essential principle of the pigment dispersing method is to coat the pigment color resist agent on a transparent substrate, and then irradiate it with a light such as light from an ultraviolet lamp, so that the pigment color resist agent is solidified to form a color film layer. The pigment color resist agent comprises, among others, a pigment dispersion liquid, which essentially comprises a color pigment, a dispersion agent, a resin and a solvent.

In the pigment dispersion liquid, the pigment is generally dispersed in the solvent medium by means of mechanical ball milling or ultrasonic pulverization, and the pigment aggregates are broken into small particles under the effect of the external force. The dispersion agent is adsorbed on the surface of the pigment particle, which prevents the aggregation of the pigment particles and allows the pigment particles being dispersed stably and uniformly in the medium.

In order to improve the stability of the pigment dispersion liquid, most of the prior researches adopt a method of adding additives (such as dispersing resin, phase-supporting agent thereto. Although such method can improve the dispersivity of the pigment, it has a negative effect on the chromaticity of the pigment; and after the pigment forms the film, the purity and the saturation of the color of the pigment will be reduced. Additionally, due to the fixity of the color of the pigment, it is difficult to adjust the pigment dispersion liquid to a desired chromaticity.

SUMMARY OF THE INVENTION

An object of the invention is to provide use of quantum dots in a pigment dispersion liquid.

Another object of the invention is to provide a pigment dispersion liquid.

Another object of the invention is to provide a process for producing a pigment dispersion liquid.

The quantum dots have a relatively small size in nano-level. They can be dispersed in a solvent easily and thus have a good dispersivity. By using the good dispersivity of the quantum dots, they can be used as the isolation layer among the pigment particles to prevent the aggregation of the pigment particles and thus to improve the stability of the pigment dispersion liquid. Additionally, due to the size effect of the quantum dots, it is possible to modify the quantum dots in terms of the adsorption of the light wave by controlling the size of the quantum dots, by which the color properties of the pigment can be improved and controlled. Based on the principle mentioned above, the invention provides use of quantum dots in a pigment dispersion liquid.

The quantum dots can be in any shape, such as spherical, quadrangular, rod-shape or the like; preferably spherical shape.

The quantum dots can be water soluble quantum dots or oil soluble quantum dots, preferably oil soluble quantum dots.

The quantum dots are selected from one or more of doped or undoped quantum dots of zinc sulfide, zinc oxide, gallium nitride, zinc selenide, cadmium sulfide, gallium selenide, cadmium selenide, zinc telluride, cadmium telluride, gallium arsenide, indium phosphide and lead telluride.

The pigment dispersion liquid provided by the invention comprises quantum dots and a pigment.

Preferably, the pigment dispersion liquid provided by the invention comprises the following components in terms of part by weight:
the pigment: 5 to 30 parts;
the quantum dots: 1 to 10 parts;
a dispersion agent: 1 to 20 parts;
a dispersing resin: 1 to 15 parts; and
a solvent: 50 to 100 parts.

More preferably, the pigment dispersion liquid comprises the following components in terms of part by weight:
the pigment: 5 to 20 parts;
the quantum dots: 1 to 5 parts;
the dispersion agent: 5 to 15 parts;
the dispersing resin: 1 to 10 parts; and
the solvent: 60 to 90 parts.

Here, the quantum dots are spherical quantum dots.
Here, the quantum dots are oil soluble quantum dots.
Here, the quantum dots are selected from one or more of doped or undoped quantum dots of zinc sulfide, zinc oxide, gallium nitride, zinc selenide, cadmium sulfide, gallium selenide, cadmium selenide, zinc telluride, cadmium telluride, gallium arsenide, indium phosphide and lead telluride.

Here, the pigment is selected from one or more of red pigment, yellow pigment, blue pigment, green pigment, and violet pigment.

Here, the dispersion agent is selected from one or more of an amide based polymer, a modified polyurethane polymer, a high molecular block copolymer containing a pigment-philic group, a modified polyurethane, a modified polyacrylate, and a silicone surfactant.

Here, the dispersing resin is selected from one or more of an epoxy acrylate, a phenolic resin, a modified styrene-acrylate copolymer, and a styrene-maleic anhydride copolymer.

Here, the solvent is selected from one or more of ethylene glycol ether, ethyl acetate, methyl ethyl ketone, methyl isobutyl ketone, monomethyl ether ethylene glycol ester, propylene glycol monomethyl ether, propylene glycol methyl ether acetate, propylene glycol monomethyl ether acetate, isopropanol, and n-butanol.

The process for producing the pigment dispersion liquid provided by the invention comprises:

(1) a pre-dispersing stage of adding the dispersion agent, the dispersing resin, the pigment, the quantum dots, and 20 to 80 wt % of the solvent, and stirring them until being uniform to obtain a pigment mixture;

(2) a grinding stage of grinding the pigment mixture prepared in the pre-dispersing stage; and (3) a diluting stage of adding the rest of the solvent is added into the grinded pigment mixture and stirring them for dilution to obtain the pigment dispersion liquid.

The use of the quantum dots provided by the invention broadens the application field of the quantum dots and develops the use thereof in the field of liquid crystal display.

The pigment dispersion liquid having quantum dots added therein provided by the invention has a significantly improved stability of dispersion. Furthermore, the quantum dots and the organic pigment can interact with each other by adjusting the composition, the size or the like of the quantum dots, so that the properties of the pigment is improved and the contrast thereof is increased. Compared with the pigment dispersion liquid having no quantum dots added therein, the pigment dispersion liquid having quantum dots added therein has a contrast increased by 40-60%.

Figure 1:
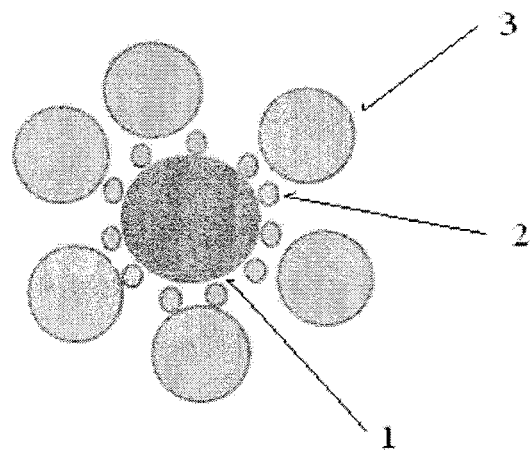
FIG. 1 is a schematic drawing of the dispersion of the pigment being milled, wherein mill beads are added (comprising spherical quantum dots).

In the drawings: 1. pigment particles; 2. spherical quantum dots; 3. mill beads.

DETAILED DESCRIPTION OF THE INVENTION

The pigment dispersion liquid provided by the embodiments of the invention comprises 5 to 30 parts of a pigment, 1 to 10 parts of quantum dots, 1 to 20 parts of a dispersion agent, 1 to 15 parts of a dispersing resin, and 50 to 100 parts of a solvent, in terms of part by weight.

Preferably, the pigment dispersion liquid comprises 5 to 20 parts of the pigment, 1 to 5 parts of quantum dots, 5 to 15 parts of the dispersion agent, 1 to 10 parts of the dispersing resin, and 60 to 90 parts of the solvent, in terms of part by weight.

In the pigment dispersion liquid of the embodiments of the invention, the quantum dots can be in any shape, such as spherical, quadrangular, rod-shape or the like, preferably spherical shape. It is easier to control the size of spherical quantum dots, and the production process of a spherical quantum dots is simpler and more convenient. The particle diameter of quantum dots is 1 to 100 nm, preferably 1 to 50 nm, more preferably 1 to 20 nm, and most preferably 1 to 10 nm. The quantum dots can be water soluble quantum dots or oil soluble quantum dots, preferably oil soluble quantum dots. Generally, the oil soluble quantum dots are produced by the organic solvent synthesis method under the catalysis of an organic catalyst such as ODE, TOP, oleyl amine, oleic acid, or the like. The quantum dots produced by such method have the above-mentioned organic catalyst on the surface thereof, and such organic catalyst has good mutual solubility with the organic solvents. Therefore, the dispersivity of the resulting quantum dots in the pigment dispersion liquid can be better. More preferably, the quantum dots are oil soluble spherical quantum dots.

In the pigment dispersion liquid of the embodiments of the invention, the composition of the quantum dots is not specifically restricted, so long as the quantum dots have a particle size and an absorption band conforming with the requirements of the pigment dispersion liquid for the dispersion and the color rendering. The quantum dots can consist of elements from Group II-VI or Group III-V. Preferably, the quantum dots are one or more selected from doped or undoped quantum dots of zinc sulfide, zinc oxide, gallium nitride, zinc selenide, cadmium sulfide, gallium selenide, cadmium selenide, zinc telluride, cadmium telluride, gallium arsenide, indium phosphide, and lead telluride. The doping element for doping the quantum dots can be a transition metal element, such as Fe, Mn, Zn, Co or the like, or a rare earth element, or an arbitrary other doping element.

Based on the requirement of pigment dispersion liquid for the color, it is possible to select corresponding quantum dots according to the size effect of the quantum dots, in other words, according to the absorption bands of the quantum dots having various compositions, or various sizes. Preferably, the quantum dots are quantum dots of which the color generated by stimulated luminescence is same as the color of the pigment in the pigment dispersion liquid. By taking cadmium selenide quantum dots as an example, when the mean particle diameter thereof is about 5 nm, they exhibit yellow color and can be used in a yellow pigment dispersion liquid to improve the stability of the pigment stability and the color properties of yellow pigments; and when the mean particle diameter thereof is about 7 nm, they exhibit red color and can be used in a red pigment dispersion liquid.

The quantum dots can be selected from the commercially available products or produced according to the prior art. Preferably, they are produced by the organic solvent synthesis method, such as those disclosed in Chinese patents Nos. CN 102199425A, CN 1562765A, ZL 200810031981.0 and the like.

In the pigment dispersion liquid of the embodiments of the invention, the pigment can be selected from any organic pigment used in the prior existing pigment dispersion liquid, preferably from one or more of a red pigment, a yellow pigment, a blue pigment, a green pigment, a and violet pigment. The composition of the pigment is not specifically restricted. All of the prior existing organic pigments can be used in the above-mentioned pigment dispersion liquid. Preferably, the pigment includes following types: mono azo yellow pigments, mono azo orange pigments, bis-azo pigments, naphthol series pigments, naphthol AS series pigments, azoic lake pigments, benzimidazolone pigments, azo condensation pigments, phthalocyanine pigments, quinacridone pigments, thioindigo series pigments, anthraquinone pigments, dioxazine pigments, triarylmethane pigments, diketo-pyrrolo-pyrole series pigments (DPP series pigments), quinophthalone pigments, etc. More preferably, the red pigment is selected from, for example, PR224, PR254, PR264, PR122, PR123, PR177, PR179, PR190 or the like; the yellow pigment is selected from, for example, PY1, PY12, PY13, PY83, PY93, PY95, PY109, PY126, PY138, PY139, PY150, PY174, PY180 or the like; the green pigment is selected from, for example, PG36, PG37, PG7, PG58 or the like; the blue pigment is selected from, for example, PB1, PB2, PB15, PB15:3, PB15:4, PB15:6, PB16, PB22, PB60 or the like; and the violet pigment is selected from, for example, PV32, PV36, PV38, PV39, PV23, PV9 or the like.

In the pigment dispersion liquid of the embodiments of the invention, the dispersion agent can be selected from any dispersion agent used in the existing pigment dispersion liquid, preferably from one or more of an amide based polymer, a modified polyurethane polymer, a high molecular block copolymer containing a pigment-philic group, a modified polyurethane, a modified polyacrylate, a silicone surfactant. More preferably, the dispersion agent is selected from the common commercially available dispersion agents, such as BYK series (BYK Chemical, Germany) dispersion agent, solsperse series (Lubrizol Co., Germany) dispersion agent or similar dispersion agents made by Chinese manufacturers.

In the pigment dispersion liquid of the embodiments of the invention, the dispersing resin can be selected from any dispersing resin used in the existing pigment dispersion liquid, preferably from one or more of an epoxy acrylate, a phenolic resin, a modified styrene-acrylate copolymer, a styrene-maleic anhydride copolymer. More preferably, the dispersing resin is selected from the common commercially available dispersion agents, such as Degussa epoxy acrylate resin or the similar products made by Chinese manufacturers.

In the pigment dispersion liquid of the embodiments of the invention, the solvent can be selected from any solvent used in the existing pigment dispersion liquid, preferably the organic solvents having better compatibility with the quantum dots, for example, from one or more of ethylene glycol ether, ethyl acetate, methyl ethyl ketone, methyl isobutyl ketone, monomethyl ether ethylene glycol ester, propylene glycol monomethyl ether, propylene glycol methyl ether acetate, propylene glycol monomethyl ether acetate, isopropanol, and n-butanol.

In the production of the pigment dispersion liquid the embodiments of the invention, arbitrary existing process for producing the same in the field of the pigment dispersion liquid can be adopted. Generally, the production of the pigment dispersion liquid includes two main steps, i.e. pre-dispersing and grinding. In the pre-dispersing step, the quantum dots are added together with the dispersion agent, the dispersing resin, the pigment, and all or a part of the solvent, wherein the order of the addition is not specifically restricted and can be determined easily by those skilled in the art. Preferably, the process for producing the pigment dispersion liquid comprises:

(1) a pre-dispersing stage of adding the dispersion agent, the dispersing resin, the pigment, the quantum dots, and 20 to 80 wt % of the solvent and stiffing them until being uniform to obtain a pigment mixture;

(2) a grinding stage of grinding the pigment mixture prepared in the pre-dispersing stage; and (3) a diluting stage of adding the rest of the solvent into the grinded pigment mixture and stirring them for dilution to obtain the pigment dispersion liquid.

More preferably, the process for producing the pigment dispersion liquid comprises:

(1) a pre-dispersing stage of adding the dispersion agent, the dispersing resin, the pigment, the quantum dots, and 20 to 80 wt % of the solvent and stirring them at a rotation speed of 1800 to 3200 rpm for 1 to 5 h until being uniform to obtain a pigment mixture;

(2) a grinding stage of grinding the pigment mixture prepared in the pre-dispersing stage at a rotation speed of 800 to 2400 rpm for 0.5 to 3 h;

(3) a diluting stage of adding the rest of the solvent into the grinded pigment mixture and stiffing them for dilution at a rotation speed of 400 to 1000 rpm for 10 to 60 min to obtain the pigment dispersion liquid.

The following examples are used to illustrate the invention, but not to limit the scope of the invention thereto. If being not specifically indicated, all agents used in the example are common commercially available agents, and the technical means used in the examples are common means well known by those skilled in the art.

Example 1

A Pigment Dispersion Liquid Containing Cadmium Selenide Quantum Dots

I. Raw Materials red pigment powders (PR254) 100 g, spherical cadmium selenide quantum dots having a mean particle diameter of about 7 nm (emitting red light while being excited by a backlight source) 20 g, dispersion agent (BYK2000) 80 g, dispersing resin (Degussa PQ611) 30 g, propylene glycol methyl ether acetate (PMA) solvent 770 g.

II. Process of Production

1. The dispersion agent, the dispersing resin, the pigment powders, the cadmium selenide quantum dots and 470 g PMA were added, and stirred at a rotation speed of 2700 rpm for 4 h until being uniform, to obtain a pigment mixture.

2. The prepared pigment mixture was fed into a sand mill, and grinded at a rotation speed of 1300 rpm for 1 h. The state of the dispersion of the pigment during the grinding is shown in FIG. 1.

Figure 2:
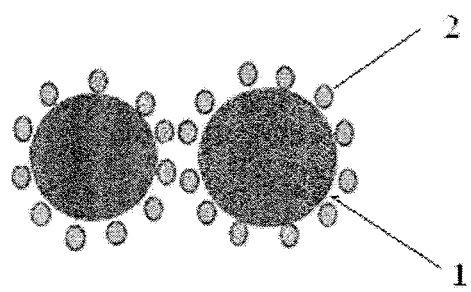
FIG. 2 is a schematic drawing of the dispersion of the pigment after spherical quantum dots are added therein.

3. 300 g PMA was added to the grinded pigment mixture and they were stirred for dilution at a rotation speed of 600 rpm for 40 min, to obtain the pigment dispersion liquid. The state of the dispersion of the pigment is shown in FIG. 2.

The changes of the viscosity and the particle diameter of the pigment particles in the pigment dispersion liquid over time were examined Whether deposits occurred at the bottom of the vessel was observed visually. The examination method was to detect the changes of the viscosity and the diameter over time at the normal temperature (25° C.) and 41° C. The examination results of the pigment dispersion liquid in Example 1 are shown in Table 1.

TABLE 1

Changes of the Particle Diameter and the Viscosity of the Pigment in the Pigment Dispersion Liquid over Time in Example 1

| Time (day) | 1 | 2 | 3 | 7 | 30 | 60 | 90 |
|---|---|---|---|---|---|---|---|
| Particle Diameter (nm)(25° C.) | 52.62 | 52.98 | 53.34 | 53.44 | 56.70 | 58.12 | 60.03 |
| Particle Diameter (nm)(41° C.) | 53.75 | 53.68 | 54.36 | 55.24 | 56.89 | 59.72 | 61.22 |
| Viscosity (cps)(25° C.) | 5.14 | 5.26 | 5.19 | 5.38 | 5.95 | 6.15 | 6.56 |
| Viscosity (cps)(41° C.) | 5.20 | 5.25 | 5.24 | 5.41 | 5.99 | 6.20 | 6.67 |
| State of Deposition | No | No | No | No | No | No | No |

It could be known from the results in Table 1 that in the pigment dispersion liquid, which was obtained after the quantum dots has been added therein, the changes of the particle diameter and the viscosity of the pigment over time were very small. No deposit occurred. The stability of the pigment dispersion liquid was improved significantly.

Example 2

A Pigment Dispersion Liquid Containing Cadmium Selenide Quantum Dots

I. Raw Materials red pigment powders (PR254) 100 g, spherical cadmium selenide quantum dots having a mean particle diameter of about 7 nm 35 g, dispersion agent (BYK2000) 80 g, dispersing resin (Degussa PQ611) 30 g, propylene glycol methyl ether acetate (PMA) solvent 755 g.

II. Process of Production

1. The dispersion agent, the dispersing resin, the pigment powders, the cadmium selenide quantum dots and 455 g PMA were added, and they were stirred at a rotation speed of 3000 rpm for 3 h until being uniform, to obtain a pigment mixture.

2. The prepared pigment mixture was added into a sand mill, and grinded at a rotation speed of 1500 rpm for 1 h.

3. 300 g PMA was added to the grinded pigment mixture and they were stirred for dilution at a rotation speed of 500 rpm for 50 min, to obtain the pigment dispersion liquid.

The changes of the viscosity and the particle diameter of the pigment particles in the pigment dispersion liquid over time were examined by a method as that of Example 1. The particle diameter of the pigment particle was 49.48 nm, and the viscosity thereof was 5.79 cps. After storage for 90 days, the extent of the change of the particle diameter was 5% or less, and the extent of the change of the viscosity was 5% or less. The changes of the particle diameter and the viscosity of the pigment over time were very small. No deposit occurred. The stability of the pigment dispersion liquid was improved significantly.

Example 3

A pigment dispersion liquid containing cadmium selenide quantum dots

I. Raw Materials red pigment powders (PR264) 180 g, spherical cadmium selenide quantum dots having a mean particle diameter of about 7 nm 15 g, dispersion agent (solsperse 32500) 140 g, dispersing resin (A81 resin) 70 g, propylene glycol methyl ether acetate (PMA) solvent 900 g.

II. Process of Production

1. The dispersion agent, the dispersing resin, the pigment powders, the cadmium selenide quantum dots and 450 g PMA were added, and they were stirred at a rotation speed of 2000 rpm for 4.5 h until being uniform, to obtain a pigment mixture.

2. The prepared pigment mixture was added into a sand mill, and grinded at a rotation speed of 800 rpm for 3 h.

3. 450 g PMA was added to the grinded pigment mixture and they were stirred for dilution at a rotation speed of 1000 rpm for 15 min, to obtain the pigment dispersion liquid.

The changes of the viscosity and the particle diameter of the pigment particles in the pigment dispersion liquid over time were examined by a method as that of Example 1. The particle diameter of the pigment particle was 50.28 nm, and the viscosity thereof was 5.91 cps. After storage for 90 days, the extent of the change of the particle diameter was 5% or less, and the extent of the change of the viscosity was 5% or less. The changes of the particle diameter and the viscosity of the pigment over time were very small. No deposit occurred. The stability of the pigment dispersion liquid was improved significantly.

Example 4

A pigment dispersion liquid containing cadmium selenide quantum dots

I. Raw Materials yellow pigment powders (PY139) 70 g, spherical cadmium selenide quantum dots having a mean particle diameter of about 5 nm (emitting yellow light while being excited by a backlight source) 40 g, dispersion agent (solsperse 32500) 100 g, dispersing resin (A81 resin) 60 g, methyl isobutyl ketone 850 g.

II. Process of Production

1. The dispersion agent, the dispersing resin, the pigment powders, the cadmium selenide quantum dots and 550 g solvent were added, and they were stirred at a rotation speed of 1800 rpm for 5 h until being uniform, to obtain a pigment mixture.

2. The prepared pigment mixture was added into a sand mill, and grinded at a rotation speed of 900 rpm for 2.5 h.

3. 300 g solvent was added to the grinded pigment mixture and they were stirred for dilution at a rotation speed of 800 rpm for 25 min, to obtain the pigment dispersion liquid.

The changes of the viscosity and the particle diameter of the pigment particles in the pigment dispersion liquid over time were examined by a method as that of Example 1. The particle diameter of the pigment particle was 50.36 nm, and the viscosity thereof was 5.22 cps. After storage for 90 days, the extent of the change of the particle diameter was 5% or less, and the extent of the change of the viscosity was 5% or less. The changes of the particle diameter and the viscosity of the pigment over time were very small. No deposit occurred. The stability of the pigment dispersion liquid was improved significantly.

Example 5

A Pigment Dispersion Liquid Containing Cadmium Telluride Quantum Dots

I. Raw Materials yellow pigment powders (PY139) 150 g, spherical cadmium telluride quantum dots having a mean particle diameter of about 4 nm (emitting yellow light while being excited by a backlight source) 30 g, dispersion agent (solsperse 32500) 120 g, dispersing resin (PQ611) 80 g, methyl isobutyl ketone 650 g.

II. Process of Production

1. The dispersion agent, the dispersing resin, the pigment powders, the cadmium telluride quantum dots and 350 g solvent were added, and they were stirred at a rotation speed of 2400 rpm for 4 h until being uniform, to obtain a pigment mixture.

2. The prepared pigment mixture was added into a sand mill, and grinded at a rotation speed of 2200 rpm for 0.5 h.

3. 300 g solvent was added to the grinded pigment mixture and they were stirred for dilution at a rotation speed of 700 rpm for 35 min, to obtain the pigment dispersion liquid.

The changes of the viscosity and the particle diameter of the pigment particles in the pigment dispersion liquid over time were examined by a method as that of Example 1. The particle diameter of the pigment particle was 51.68 nm, and the viscosity thereof was 5.72 cps. After storage for 90 days, the extent of the change of the particle diameter was 5% or less, and the extent of the change of the viscosity was 5% or less. The changes of the particle diameter and the viscosity of the pigment over time were very small. No deposit occurs. The stability of the pigment dispersion liquid was improved significantly.

Comparative Example

Figure 3:
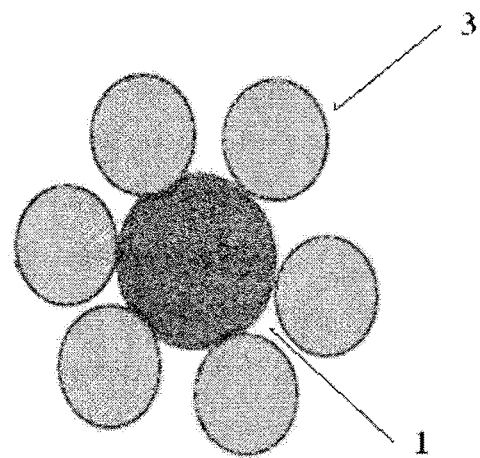
FIG. 3 is a schematic drawing of the dispersion of the pigment being milled, wherein mill beads are added (comprising no spherical quantum dots).
Figure 4:
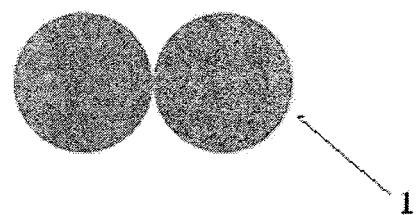
FIG. 4 is a schematic drawing of the dispersion of the pigment without any spherical quantum dots added therein.

No quantum dots were added, while the other steps were same those as in Example 1. The schematic drawing of the dispersion of the pigment during the grinding was shown in FIG. 3. The schematic drawing of the dispersion of the pigment in the produced pigment dispersion liquid was shown in FIG. 4.

The changes of the viscosity and the particle diameter of the pigment particles in the pigment dispersion liquid over time were examined by a method as that of Example 1. The examination results of the pigment dispersion liquid of the Comparative Example were shown in Table 2.

TABLE 2

Changes of the Particle Diameter and the Viscosity of the Pigment in the Pigment Dispersion Liquid over Time in the Comparative Example

| Time (day) | 1 | 2 | 3 | 7 | 30 | 60 | 90 |
|---|---|---|---|---|---|---|---|
| Particle Diameter (nm)(25° C.) | 61.27 | 62.94 | 64.52 | 102.41 | 207.53 | 212.10 | 220.35 |
| Particle Diameter (nm)(41° C.) | 62.03 | 62.98 | 65.27 | 103.25 | 209.36 | 211.95 | 229.26 |
| Viscosity (cps)(25° C.) | 5.45 | 7.83 | 18.44 | 29.58 | flocculation | flocculation | flocculation |
| Viscosity (cps)(41° C.) | 5.48 | 7.96 | 17.91 | 27.86 | flocculation | flocculation | flocculation |
| State of Deposition | No | Small amount of deposit | Large amount of deposit, forming a thin layer | Deposit layer thickening | Thickness of the deposit layer keeping increasing | Thickness of the deposit layer keeping increasing | Thickness of the deposit layer keeping increasing |

It could be known from the results in Table 2 that when no quantum dots was added, the particle diameter could be down to about 60 nm after the pigment dispersion liquid was discharged. However, after one day, the particle diameter thereof increased rapidly. After one week, the particle diameter thereof was already more than 100 nm, while the viscosity thereof also kept increasing. After one month, the pigment dispersion liquid was in a flocculation state, and the stability of the pigment dispersion liquid was very poor.

Experimental Example

The contrast of the Examples was examined. The examination method is to coat each of the pigment dispersion liquid of Examples 1-5 and the Comparative Example on a glass sheet, and then testing the contrast thereof under the same test conditions by using a general contrast tester. The results were shown in Table 3.

TABLE 3

Test Results of the Contrast of Examples 1-5 and the Comparative Example

| Sample | Ex. 1 | Ex. 2 | Ex. 3 | Ex. 4 | Ex. 5 | Com. Ex. |
|---|---|---|---|---|---|---|
| Contrast | 2389 | 2548 | 2465 | 2473 | 2510 | 1646 |

The results in Table 3 indicated that the contrasts of the pigment dispersion liquids in Examples 1-5 were significantly improved. Compared with the pigment dispersion liquid of the Comparative Example having no quantum dots added therein, the contrasts were increased by 40-60%.

It could be known from Examples 1-5, the Comparative Example and the Experimental Example that by adding quantum dots into a pigment dispersion liquid, the stability of the pigment dispersion liquid could be significantly improved, and the contrast of the pigment dispersion liquid also could be increased.

Although the invention is described above in detail with general description and specific embodiments, it is obvious to those skilled in the art that several changes or modifications can be made on the basis of the invention. Therefore, such changes or modifications without departing the spirit of the invention all belong to the scope as claimed in the invention.

What is claimed is:

1. A pigment dispersion liquid, comprising the following components in terms of part by weight:
    a pigment: 5 to 30 parts;
    quantum dots: 1 to 10 parts;
    a dispersion agent: 1 to 20 parts;
    a dispersing resin: 1 to 15 parts; and
    a solvent: 50 to 100 parts.

2. The pigment dispersion liquid according to claim 1, comprising the following components in terms of part by weight:
    the pigment: 5 to 20 parts;
    the quantum dots: 1 to 5 parts;
    the dispersion agent: 5 to 15 parts;
    the dispersing resin: 1 to 10 parts; and
    the solvent: 60 to 90 parts.

3. The pigment dispersion liquid according to claim 1, wherein the quantum dots are spherical quantum dots.

4. The pigment dispersion liquid according to claim 1, wherein the quantum dots are oil soluble quantum dots.

5. The pigment dispersion liquid according to claim 1, wherein the quantum dots are selected from one or more of doped or undoped quantum dots of zinc sulfide, zinc oxide, gallium nitride, zinc selenide, cadmium sulfide, gallium selenide, cadmium selenide, zinc telluride, cadmium telluride, gallium arsenide, indium phosphide and lead telluride.

6. The pigment dispersion liquid according to claim 1, wherein the pigment is selected from one or more of red pigment, yellow pigment, blue pigment, green pigment, and violet pigment.

7. The pigment dispersion liquid according to claim 1, wherein the dispersion agent is selected from one or more of an amide based polymer, a modified polyurethane polymer, a high molecular block copolymer containing a pigment-philic group, a modified polyurethane, a modified polyacrylate, and a silicone surfactant.

8. The pigment dispersion liquid according to claim 1, wherein the dispersing resin is selected from one or more of an epoxy acrylate, a phenolic resin, a modified styrene-acrylate copolymer, and a styrene-maleic anhydride copolymer.

9. The pigment dispersion liquid according to claim 1, wherein the solvent is selected from one or more of ethylene glycol ether, ethyl acetate, methyl ethyl ketone, methyl isobutyl ketone, monomethyl ether ethylene glycol ester, propylene glycol monomethyl ether, propylene glycol methyl ether acetate, propylene glycol monomethyl ether acetate, isopropanol, and n-butanol.

10. A process for producing the pigment dispersion liquid according to claim 1, comprising:

(1) a pre-dispersing stage of adding the dispersion agent, the dispersing resin, the pigment, the quantum dots, and 20 to 80 wt % of the solvent, and stirring them until being uniform to obtain a pigment mixture;

(2) a grinding stage of grinding the pigment mixture prepared in the pre-dispersing stage; and (3) a diluting stage of adding the rest of the solvent into the grinded pigment mixture and stirring them for dilution to obtain the pigment dispersion liquid.

* * * * *